(12) United States Patent
Bliss, Jr. et al.

(10) Patent No.: US 8,157,312 B2
(45) Date of Patent: Apr. 17, 2012

(54) UNIVERSAL MODULAR STORAGE FOR A VEHICLE

(75) Inventors: Richard Chase Bliss, Jr., Schaumburg, IL (US); Ajay Dhananjay Utpat, Pune (IN); Harishchandra Dahatonde, Pune (IN)

(73) Assignee: Knaack LLC, Crystal Lake, IL (US)

( * ) Notice: Subject to any disclaimer, the term of this patent is extended or adjusted under 35 U.S.C. 154(b) by 139 days.

(21) Appl. No.: 12/792,854

(22) Filed: Jun. 3, 2010

(65) Prior Publication Data
US 2011/0260488 A1    Oct. 27, 2011

(30) Foreign Application Priority Data

Apr. 20, 2010    (IN) .................. 1294/MUM/2010

(51) Int. Cl.
*B60R 11/00* (2006.01)
(52) U.S. Cl. ............ 296/37.6; 296/3; 224/403; 224/540
(58) Field of Classification Search .................. 211/134, 211/186, 187, 190, 191, 192, 204, 206; 224/42.32, 224/403, 485, 539, 540, 542, 543, 545, 547, 224/550, 551, 564; 296/3, 24.39, 24.3, 37.1, 296/37.6, 37.7, 37.8
See application file for complete search history.

(56) References Cited

U.S. PATENT DOCUMENTS

| | | | |
|---|---|---|---|
| 5,027,962 A * | 7/1991 | Maccarrone | .................. 211/191 |
| 5,031,781 A | 7/1991 | Price et al. | |
| 5,036,778 A | 8/1991 | Briosi | |
| 5,072,839 A | 12/1991 | Arnone | |
| 5,090,337 A | 2/1992 | Magistrelli | |
| 5,108,141 A | 4/1992 | Anderson | |
| 5,265,993 A | 11/1993 | Wayne | |
| 5,306,064 A * | 4/1994 | Padovano et al. | .......... 296/24.44 |
| 5,472,103 A | 12/1995 | Merl | |
| 5,476,301 A | 12/1995 | Berkich | |
| 5,477,971 A | 12/1995 | Howard | |
| 5,495,954 A | 3/1996 | Schmit | |
| 5,498,048 A | 3/1996 | Shelby, Jr. | |
| 5,509,541 A | 4/1996 | Merl | |

(Continued)

FOREIGN PATENT DOCUMENTS

CA        2287299        1/2001

OTHER PUBLICATIONS

Weather Guard, Van Solutions Brochure published in 2008.

(Continued)

*Primary Examiner* — Dennis Pedder
*Assistant Examiner* — Jason S Daniels
(74) *Attorney, Agent, or Firm* — McDonnell Boehnen Hulbert & Berghoff LLP

(57) ABSTRACT

A modular storage system for a vehicle is disclosed. The modular storage system includes an adjustable frame having a plurality of first posts, a plurality of second posts, a first beam connecting one of the plurality of first posts to another of the plurality of first posts, and a second beam connecting one of the plurality of second posts to another of the plurality of second posts. The first posts and second posts are each secured to a curved member. The modular storage system is attached to a rail on an interior of a vehicle. Various off-the-shelf storage components can be used with the system.

24 Claims, 12 Drawing Sheets

U.S. PATENT DOCUMENTS

| | | | |
|---|---|---|---|
| 5,513,908 A | 5/1996 | Williams | |
| 5,588,540 A | 12/1996 | Schmit | |
| 5,611,442 A | 3/1997 | Howard | |
| 5,641,081 A | 6/1997 | Merl | |
| 5,697,742 A | 12/1997 | House | |
| 5,752,610 A | 5/1998 | Remmers | |
| 5,769,247 A | 6/1998 | Merl | |
| 5,819,958 A | 10/1998 | Dement | |
| 5,845,952 A | 12/1998 | Albertini et al. | |
| 5,848,711 A | 12/1998 | Schmit | |
| 5,927,783 A | 7/1999 | Baka | |
| 6,062,401 A | 5/2000 | Hall et al. | |
| 6,077,007 A | 6/2000 | Porter et al. | |
| 6,123,033 A | 9/2000 | Polley et al. | |
| 6,164,610 A | 12/2000 | Santiago | |
| 6,176,540 B1 | 1/2001 | Whittaker | |
| 6,223,913 B1 | 5/2001 | Mosher | |
| 6,260,488 B1 | 7/2001 | Yang et al. | |
| 6,427,855 B2 | 8/2002 | LaBruna, Jr. et al. | |
| 6,511,272 B2 | 1/2003 | Stafford | |
| 6,655,538 B2 | 12/2003 | Saulnier-Matteini | |
| 6,733,222 B2 | 5/2004 | Freudelsperger | |
| 6,799,784 B2 | 10/2004 | Rios | |
| 7,044,348 B2 | 5/2006 | McKenzie et al. | |
| 7,314,143 B1 | 1/2008 | Johnson | |
| 7,338,110 B1 | 3/2008 | Eckloff | |
| 7,407,216 B2 | 8/2008 | Taylor | |
| 7,665,619 B2 | 2/2010 | Mangano | |
| 2003/0094124 A1 | 5/2003 | Wishart et al. | |
| 2003/0127482 A1 | 7/2003 | Gort | |
| 2003/0155318 A1 | 8/2003 | Jacobs et al. | |
| 2003/0233965 A1 | 12/2003 | Brazier | |
| 2004/0217073 A1 | 11/2004 | Dobler et al. | |
| 2005/0039644 A1 | 2/2005 | Sheahan et al. | |
| 2005/0127017 A1 | 6/2005 | Kessel et al. | |
| 2005/0167383 A1 | 8/2005 | Taccolini et al. | |
| 2005/0225108 A1 | 10/2005 | Panasewicz et al. | |
| 2007/0069542 A1 | 3/2007 | Steiger et al. | |
| 2007/0095773 A1 | 5/2007 | Schwerman | |
| 2007/0210024 A1 | 9/2007 | Haake | |
| 2008/0012375 A1* | 1/2008 | Steiger et al. | 296/37.6 |
| 2008/0060557 A1 | 3/2008 | Kashihara | |
| 2008/0121672 A1 | 5/2008 | Ripaldi et al. | |
| 2008/0253857 A1 | 10/2008 | McJunkin | |
| 2009/0039040 A1 | 2/2009 | Johnson et al. | |
| 2009/0071991 A1 | 3/2009 | Evans | |
| 2010/0006520 A1* | 1/2010 | Winget et al. | 211/70.6 |
| 2011/0018411 A1* | 1/2011 | Steiger et al. | 312/237 |

OTHER PUBLICATIONS

Weather Guard Vehicle Solutions 3D Design Van Design, website, www.weatherguard.com/van_storage_equipment/van_designtool.php, printed on May 20, 2010.

* cited by examiner

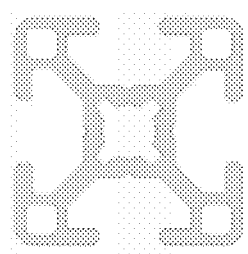
Figure 3A
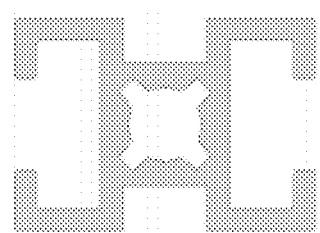
Figure 3B
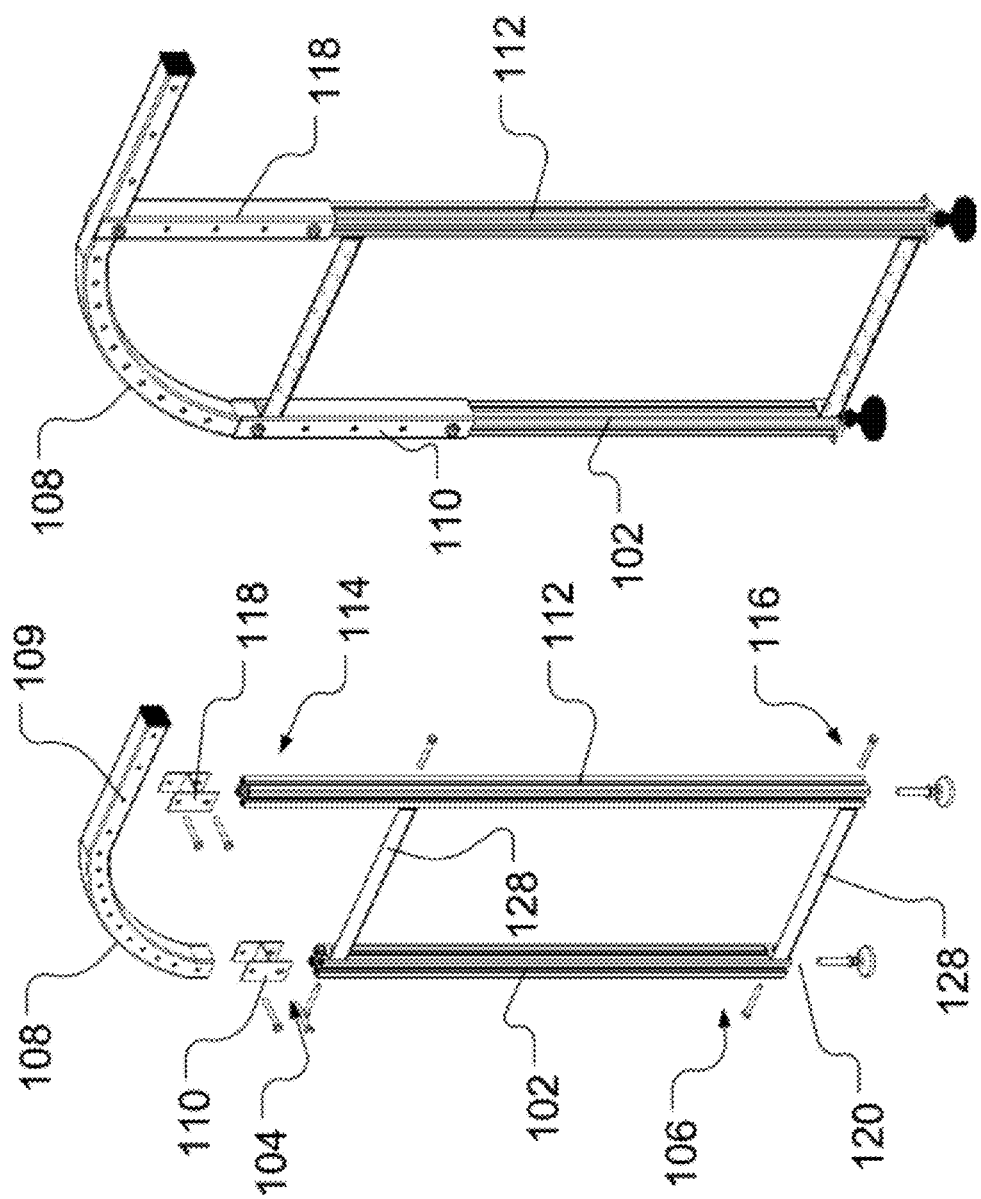
Figure 2B
Figure 2A

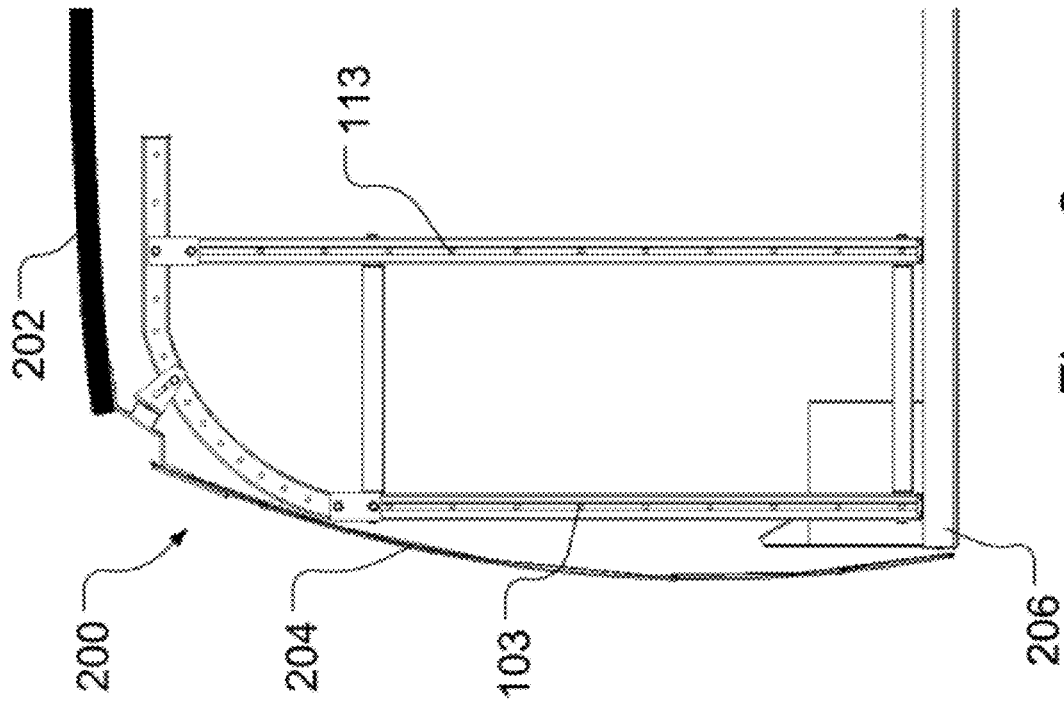
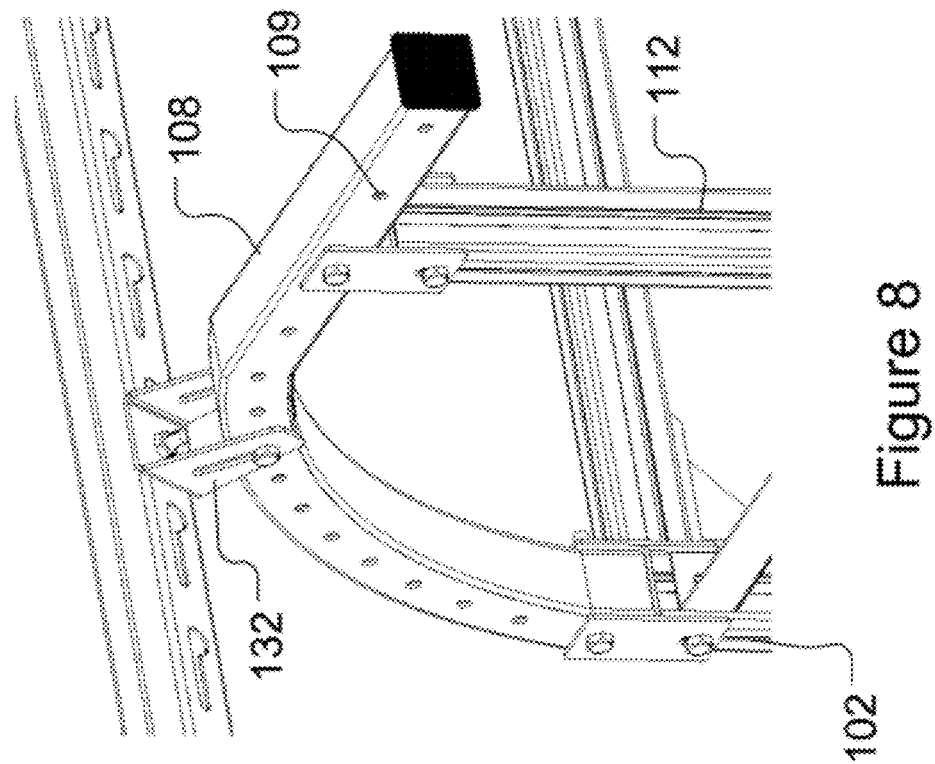

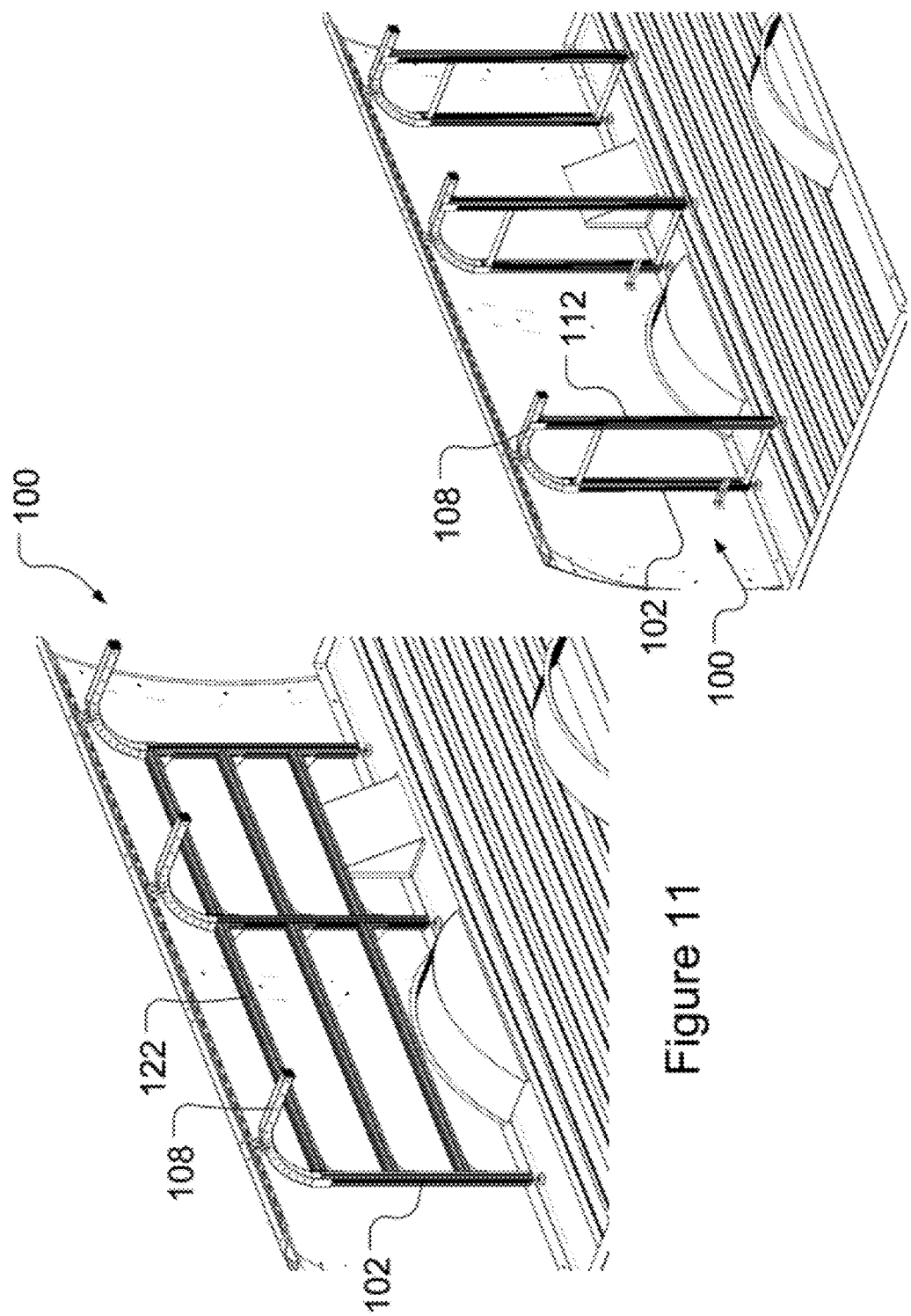

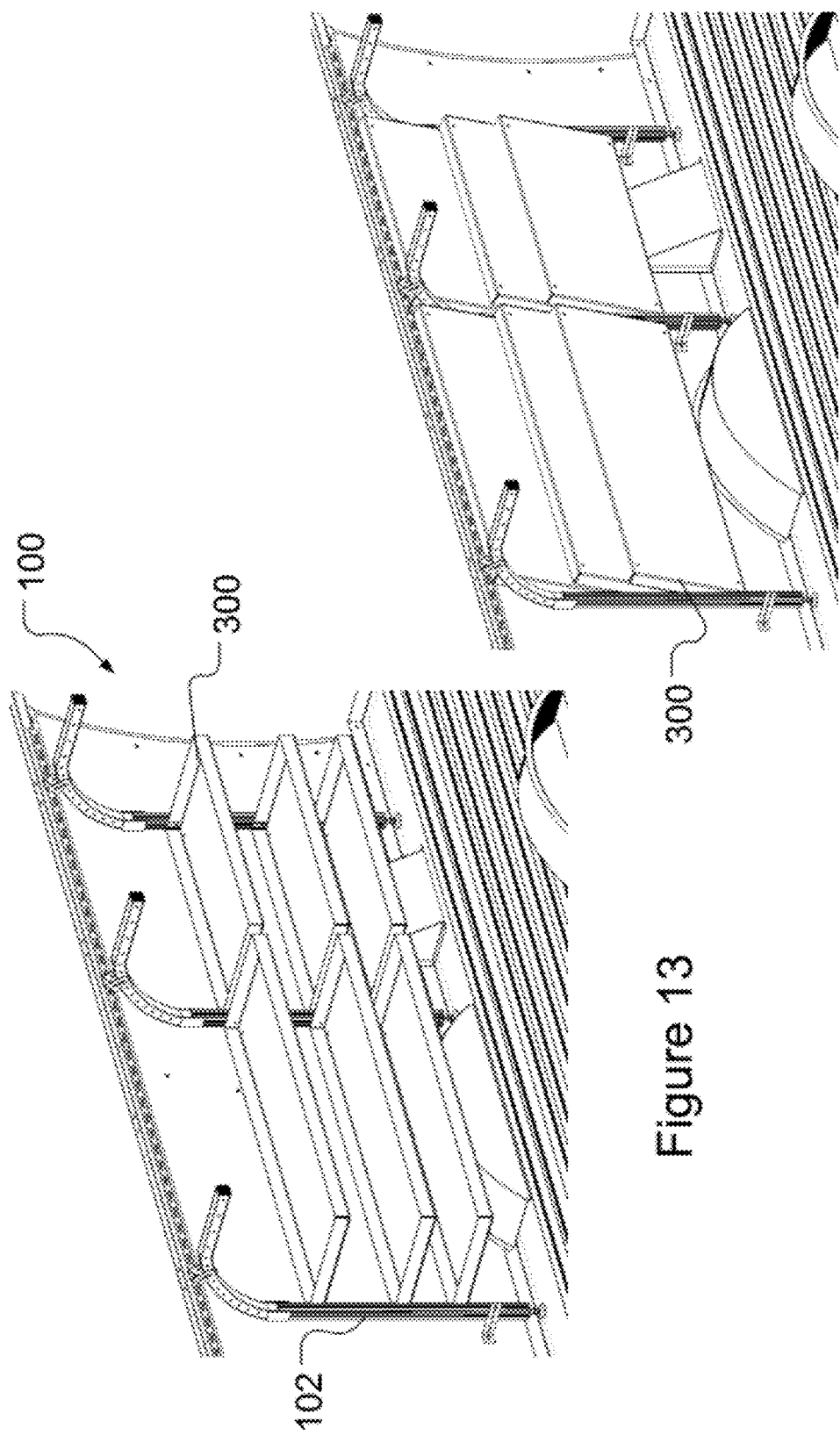

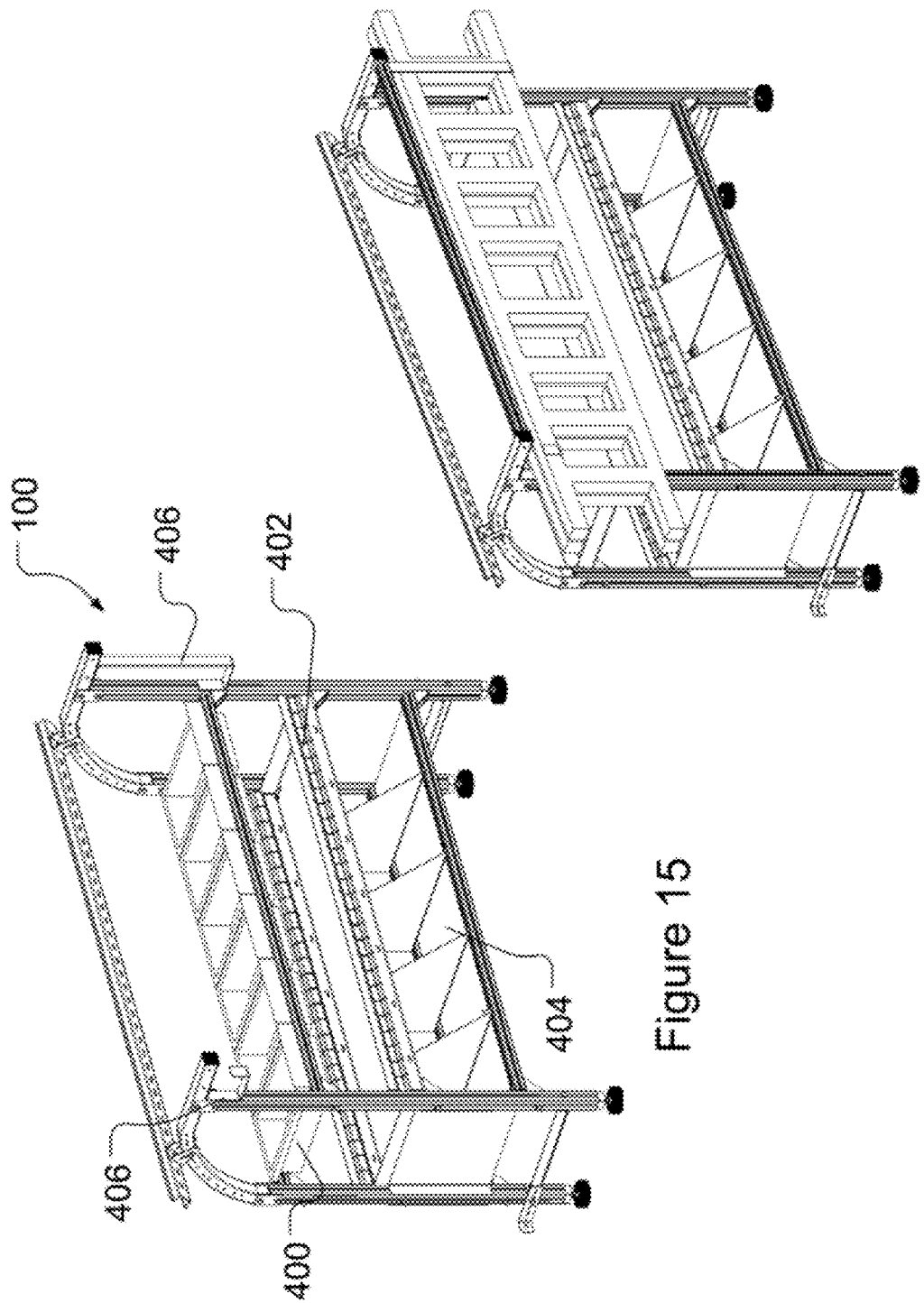

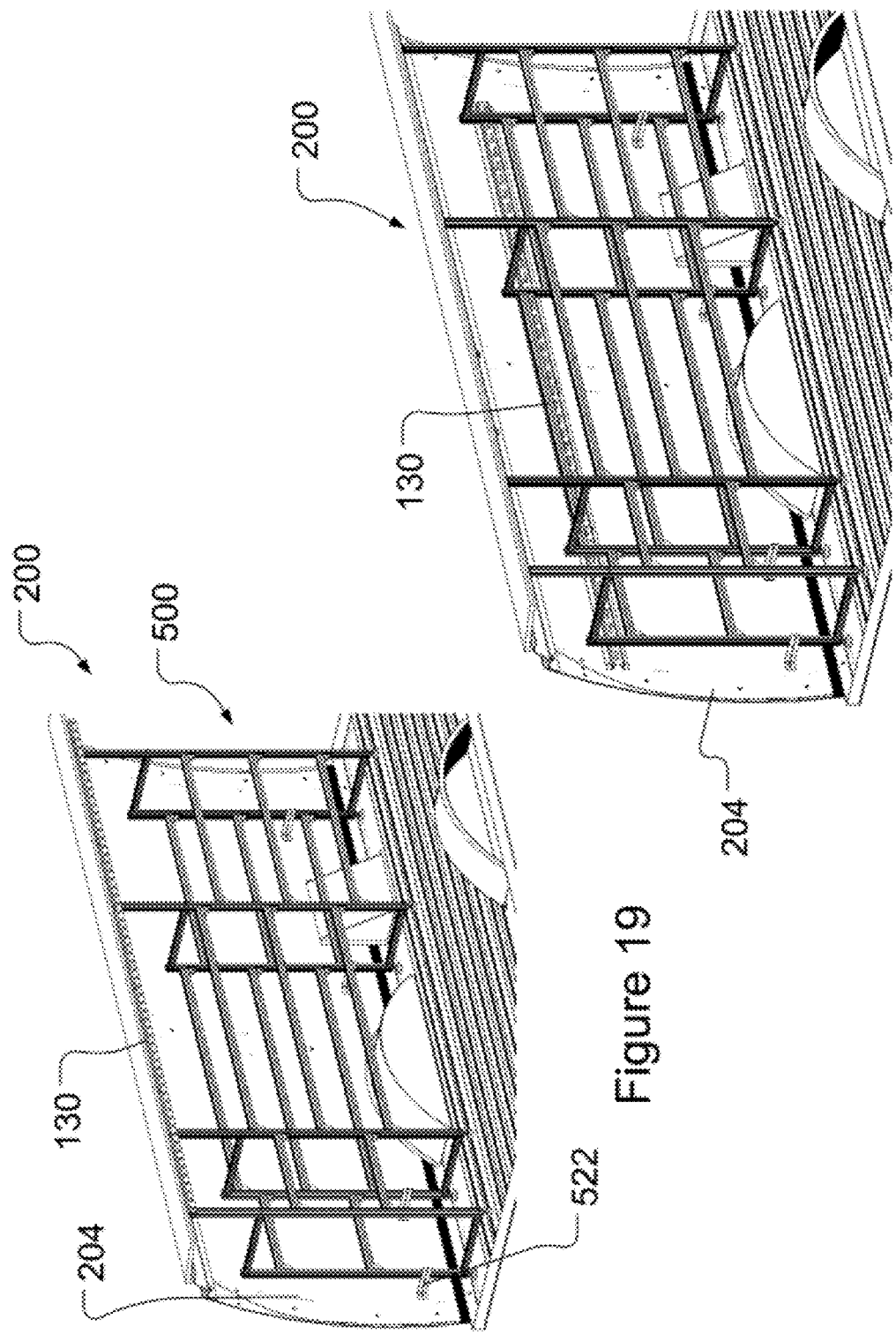

_US 8,157,312 B2_

UNIVERSAL MODULAR STORAGE FOR A VEHICLE

PRIORITY

This application claims priority to Indian application No. 1294/MUM/2010 filed on Apr. 22, 2010.

BACKGROUND

1. Field of the Application

The present invention relates generally to a modular storage system for a vehicle, and more particularly to a modular storage system adapted and adaptable for the storage or cargo space of a van, the system being lightweight but durable, and accommodating vans of various shapes and sizes.

2. Description of the Related Art

Many workers use specialized tools and equipment in performing their daily tasks. These professions normally consist of electrical, mechanical, general construction, surveying, or associated trades in which it is necessary to have on-site access to a wide variety of specialized tools, equipment, and supplies. Because many job sites are away from the job shop, any tools and equipment needed must be transported to the job site. A worker typically acquires a vehicle large enough to accommodate the tools, equipment, and supplies required at the job site. It is common to see a worker transporting ladders on a rack attached to the top of a truck, van or even an automobile, or to see sheets of glass in a special rack attached to the side of a truck or van. These methods are acceptable for some workers, but others, especially electricians, telephone repairers, cable installers, carpenters, and plumbers, must carry an assortment of tools, fasteners, ladders, pipes and other supplies to be adequately prepared to complete a job or service call.

Existing storage components for vehicles typically include a number of heavy-gauge steel shelving and cabinet units which must be custom designed for different model vehicles. Once the components are installed, they cannot be easily removed or rearranged. Accordingly, it would be highly desirable to provide a storage area for tools, supplies and equipment that is lightweight, portable, adjustable, and is universal so as to accommodate any size or model vehicle.

These as well as other aspects and advantages will become apparent to those of ordinary skill in the art by reading the following detailed description, with reference where appropriate to the accompanying drawings. Further, it should be understood that the embodiments described in this summary and elsewhere are intended to illustrate the invention by way of example only.

SUMMARY

The present application provides a modular storage system that can be adapted for the storage space in vehicles of various shapes and sizes. Often the storage space of a vehicle may have sidewalls and floors that curve or project into the space, which complicate the installation and use of a storage system.

In one embodiment, the modular storage system includes a frame having a plurality of first posts, curved members, and second posts. The first posts are generally vertical, and each secured to the curved member. The second posts are also generally vertical, and each secured to the curved members, and are spaced a distance away from each of the plurality of first posts. A first beam, generally horizontal, connects one of the plurality of first posts to another of the plurality of first posts. A second beam, generally horizontal, connects one of the plurality of second posts to another of the plurality of second posts. Each curved member has such a shape so as to enable the modular storage system to be useable with cargo spaces of different shapes and sizes in a plurality of different vehicles. A rail is preferably mounted to an interior of the vehicle at least one of the curved members is secured to the rail.

In another embodiment, a method of installing a modular storage system for a vehicle is disclosed. In this embodiment, a frame is provided including a plurality of first posts each having a first end and a second end. The first posts are generally vertical and each secured to a curved member at the first end. The frame further includes a plurality of second posts each having a first end and a second end. The second posts are generally vertical and each secured to the curved members at the first end and spaced a distance away from each of the plurality of first posts. A first generally horizontal beam connects one of the plurality of first posts to another of the plurality of first posts. A second generally horizontal beam connects one of the plurality of second posts to another of the plurality of second posts. The method further includes securing the curved members to a plurality of brackets located on a rail attached to an interior of the vehicle, securing the first posts to the interior of the vehicle, and securing the second end of the first and second posts to a floor of the vehicle without drilling into the floor of the vehicle.

In yet another embodiment, a vehicle cargo space including a modular storage system is disclosed. The modular storage system includes a frame having a plurality of first posts, curved members, and second posts. The first posts are generally vertical, and each secured to the curved member. The second posts are also generally vertical, and each secured to the curved members, and are spaced a distance away from each of the plurality of first posts. A first beam, generally horizontal, connects one of the plurality of first posts to another of the plurality of first posts. A second beam, generally horizontal, connects one of the plurality of second posts to another of the plurality of second posts. Each curved member has such a shape so as to enable the modular storage system to be useable with cargo spaces of different shapes and sizes in a plurality of different vehicles. A rail is preferably mounted to an interior of the vehicle and a bracket secures at least one of the curved members to the rail.

BRIEF DESCRIPTION OF THE DRAWINGS

Exemplary embodiments of the invention are described herein with reference to the drawings, in which:

FIG. 2A is an exploded view of the frame shown in FIG. 1;

FIG. 2B is a perspective view of an alternate embodiment of posts used with the frame;

FIG. 3A is a cross-sectional view of one end of a post used with the frame shown in FIG. 1;

FIG. 3B is a cross-sectional view of an alternate embodiment of one end of a post used with the frame shown in FIG. 1;

FIG. 8 is a front view of the frame attached to the bracket;

FIG. 9 is a side view of the frame attached to the bracket;

FIG. 11 is a perspective view of an alternate configuration of the frame installed into a vehicle;

FIG. 12 is a perspective view of an alternate configuration of the frame installed into a vehicle;

FIG. 13 is a perspective view of shelving used with the frame shown in FIG. 1;

FIG. 14 is a perspective view of the shelving shown in FIG. 13 in a folded position;

FIG. 15 is a perspective view of the frame shown in FIG. 1 having storage features;

FIG. 16 is a perspective view of the frame shown in FIG. 1 having a ladder storage feature;

FIG. 19 is a perspective view of one embodiment of the frame of FIG. 18 installed into a vehicle; and FIG. 20 is a perspective view of another embodiment of the frame of FIG. 18 installed into a vehicle.

DETAILED DESCRIPTION

The present application provides a universal modular storage system for a vehicle, such as a van or truck. The modular storage system may include an adjustable frame which is configured to be installed into any size or model van. The frame may be adjusted either before or after installation. The modular storage system may also include multiple storage components to accommodate different types of equipment and tools.

Figure 1:
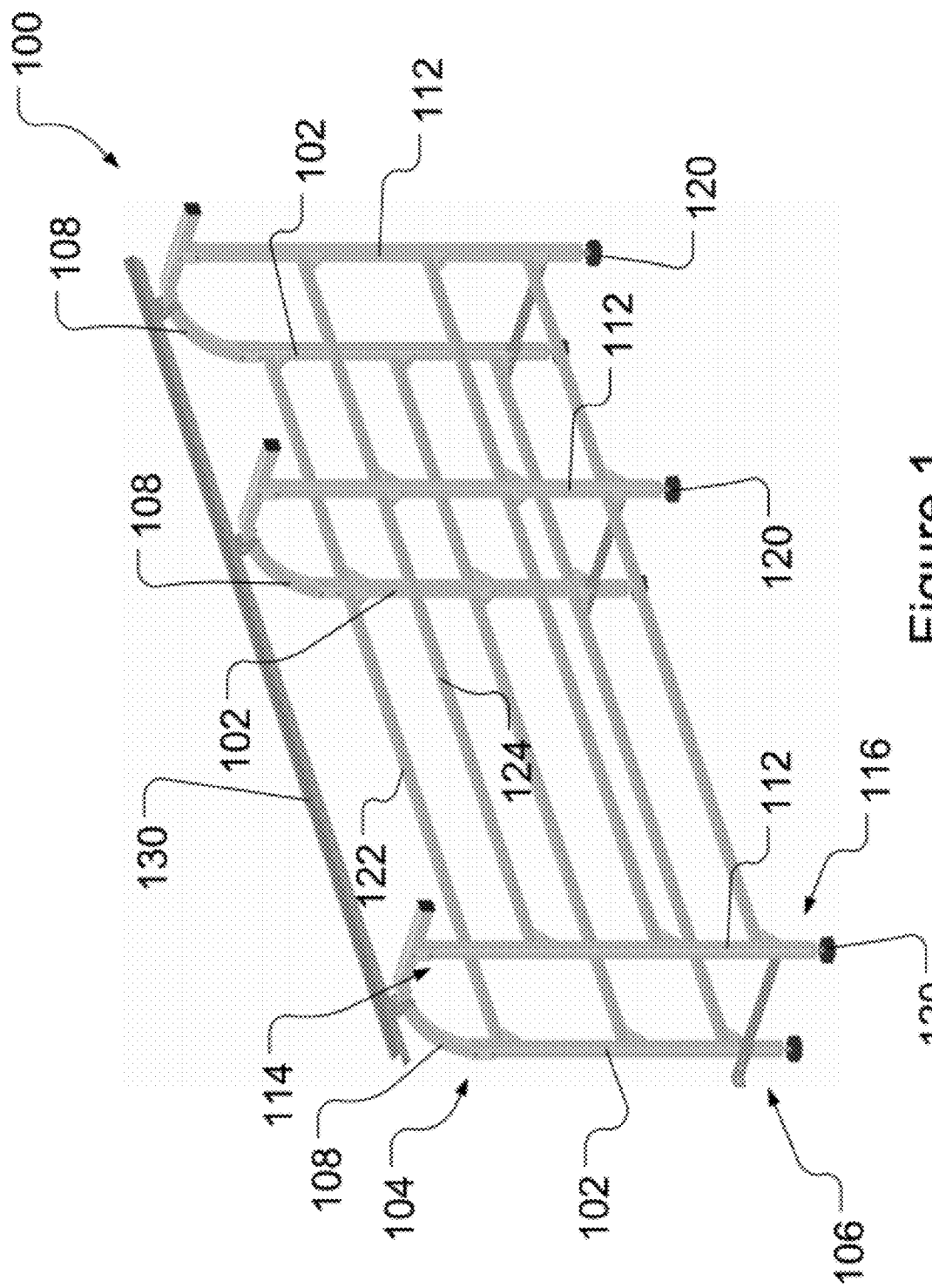
FIG. 1 is a front perspective view of a frame according to teachings of the present invention.

Turning now to the drawings, FIG. 1 shows an example adjustable frame 100 for insertion into the storage or cargo area of a vehicle, such as a cargo van. Alternatively, the frame may be used with pick-up trucks, open-bed trucks, or trailers. The frame 100 may include a plurality of first posts 102, such as three first posts 102 as shown in FIG. 1. Each first post 102 may have a first end 104 and a second end 106, and is generally vertical. Each first post 102 may also include at a plurality of holes 103, which are shown in FIG. 9. Each first post 102 may be attached to a curved member 108 at the first end 104. Alternatively, the curved member 108 may be attached to the second end 106 of the first post 102 as both ends of the post have similar configurations. The first posts 102 may be secured to the curved members 108 by a first bracket 110, such as an H-bracket, which is shown in FIG. 2A. Alternatively, any suitable fastening mechanism may be used to connect the first posts 102 to the curved members 108. The height of the frame 100 may be adjusted by using longer or shorter first brackets 110. In another embodiment, the first posts 102 may include telescoping members that fit within the first brackets 110 and may be lengthened or shortened to adjust the height of the frame 100, which is shown in FIG. 2B.

The frame 100 may further include a plurality of second posts 112, such as three second posts 112 shown in FIG. 1. Each second post 112 may have a first end 114 and a second end 116, and is generally vertical. Each first post 112 may also include at a plurality of holes 113, which are shown in FIG. 9. Each second post 112 may be attached to the curved member 108 at the first end 114, and may be spaced a distance away from each of the plurality of the first posts 102. The second posts 112 may be attached to the curved member 108 by a second bracket 118, such as an H-bracket, which is shown in FIG. 2A. Alternatively, any suitable fastening mechanism may be used to connect the second posts 112 to the curved members 108. The height of the frame 100 may be adjusted by using longer or shorter second brackets 118. In another embodiment, the second posts 112 may include telescoping members that fit within the second brackets 118 and may be lengthened or shortened to adjust the height of the frame 100, which is shown in FIG. 2B.

The first posts 102 and second posts 112 may be provided in different lengths and may be made of a lightweight but sturdy material, such as aluminum, for example. As mentioned above, the first and second posts 102, 112 may include telescoping members to adjust the height of the frame 100. The first and second posts 102, 112 may each have a load capacity of 300 lbs. or 500 lbs., for example. Further, the first posts 102 and second posts 112 may have a profile, such as that shown in FIG. 3A or 3B, to facilitate assembly and rearrangement of the frame 100 and storage components. The profiles also allow for a number of different fasteners to be used to assemble the frame, such as bolts, hinges, rollers, hooks, etc.

The curved members 108 may be constructed so that they may be used universally in any size cargo vehicle. The shape and angle of the curved members 108 may be determined by studying various van profiles available in the market. The curved members 108 may be made of aluminum or steel, for example. The curved members 108 may further include a plurality of holes 109 so that the distance between the first and second posts 102, 112 may be adjustable. The holes 109 may also be used to adjust the frame 100 before, after, or during installation into a vehicle. Thus, the distance between the first and second posts 102, 112, or width of the frame 100, is adjustable.

Figure 4:
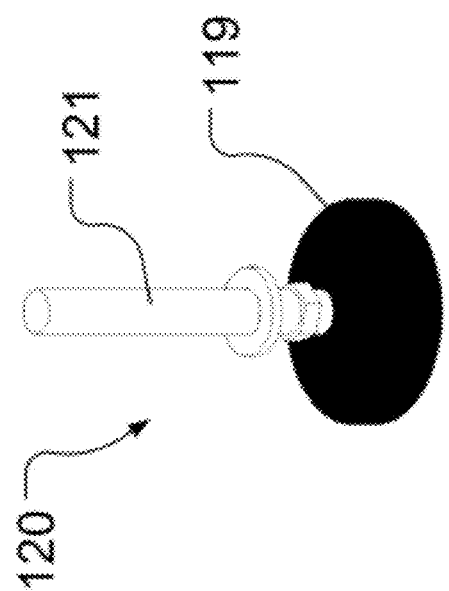
FIG. 4 is a perspective view of a foot for use with the frame shown in FIG. 1.

The first and second posts 102, 112 may also each include a foot 120 located at the second ends 106, 116 of the first posts 102 and second posts 112, respectively. The feet 120 may be a compression mounts, for example, as shown in FIG. 4. Alternatively, the feet 120 may comprise a leveling foot or any other suitable foot. The feet 120 may include a rubber base 119 attached to a threaded bolt 121, for example. The rubber base may swivel up to 5° to compensate for uneven floors. The height of the feet 120 may be adjustable from 2 inches to 5 inches, for example, by adjusting the bolt 121. Thus, the frame may be further adjustable in height so the frame 100 can fit into any size vehicle. Unlike the support used in the prior art, the foot 120 is not drilled into a floor of the vehicle 200, which allows for portability of the frame 100 and contributes to ease of installation. Thus, drilling into the floor of the vehicle, which may affect the structural integrity of vehicle and pose a safety concern, is avoided.

Figure 5:
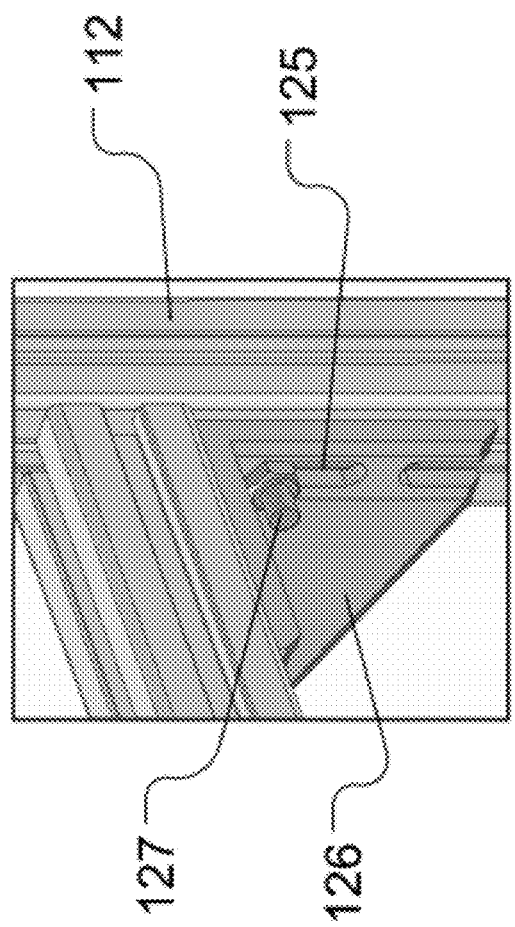
FIG. 5 is a perspective view of a gusset for use with the frame shown in FIG. 1.

Turning back to FIG. 1, the frame 100 may further comprise at least one first beam 122 for connecting one first post 102 to another first post 102. Alternatively, the frame 100 may include a plurality of first beams 122, as shown in FIG. 1. The frame 100 may further include at least one second beam 124 for connecting one second post 112 to another second post 112. Alternatively, the frame 100 may include a plurality of second beams 124. The first and second beams 122, 124 may be generally horizontal. The first and second beams 122, 124 may be secured to the first and second posts 102, 112, respectively, by a plurality of gussets 126, for example, as shown in FIG. 5. The gussets may have a generally triangular shape and may include a plurality of slots 125. The gussets 126 may secure the posts 102, 112 to the beams 122, 124 by fasteners 127, which may be bolts, screws, or any suitable fastener, that are secured through the slots 125 of the gussets 126. The fasteners 127 may be secured to the holes 103, 113 located in the first and second posts 102, 112. Each post may include a plurality of holes 103, 113 which may be spaced apart by a distance of 3 inches, for example. Thus, the positions of the first and second beams 122, 124 may be adjustable in a vertical direction along the first and second posts 102, 112. Alternatively, any suitable adjustable fastening mechanism may be used to secure the first and second beams 122, 124 to the first and second posts 102, 112.

The first and second beams 122, 124 may be provided in different lengths and may be made of a lightweight but sturdy material, such as aluminum, for example. For instance, the beams 122, 124 may be provided in lengths of 18 inches, 36 inches, 54 inches, and 72 inches. The first and second beams 122, 124 may have a load capacity of 300 lbs. or 500 lbs., for example. Further, the first beam 122 and second beam 124 may have a profile such as the profiles shown in FIG. 3A or 3B to facilitate assembly and rearrangement of the frame and storage components. In another embodiment, the first and second beams 122, 124 may include telescoping members that may be lengthened or shortened to adjust the length of the frame 100.

The frame 100 may further include one or more cross beams 128, as shown in FIG. 2, to connect a first post 102 to a second post 112. The cross beams 128 provide additional stability to the frame 100. The cross beams 128 may be made of aluminum, for example, and may have a load capacity and profile similar to those described above with respect to the posts 102, 112 and beams 122, 124. The cross beams 128 may be secured to the first and second posts 102, 112 by bolts, screws, or any other suitable fastener.

Figure 7:
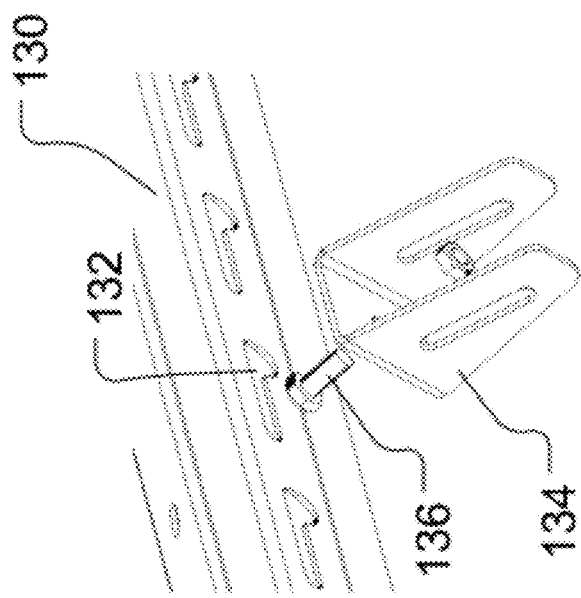
FIG. 7 is a close-up view of the bracket shown in FIG. 6.
Figure 6:
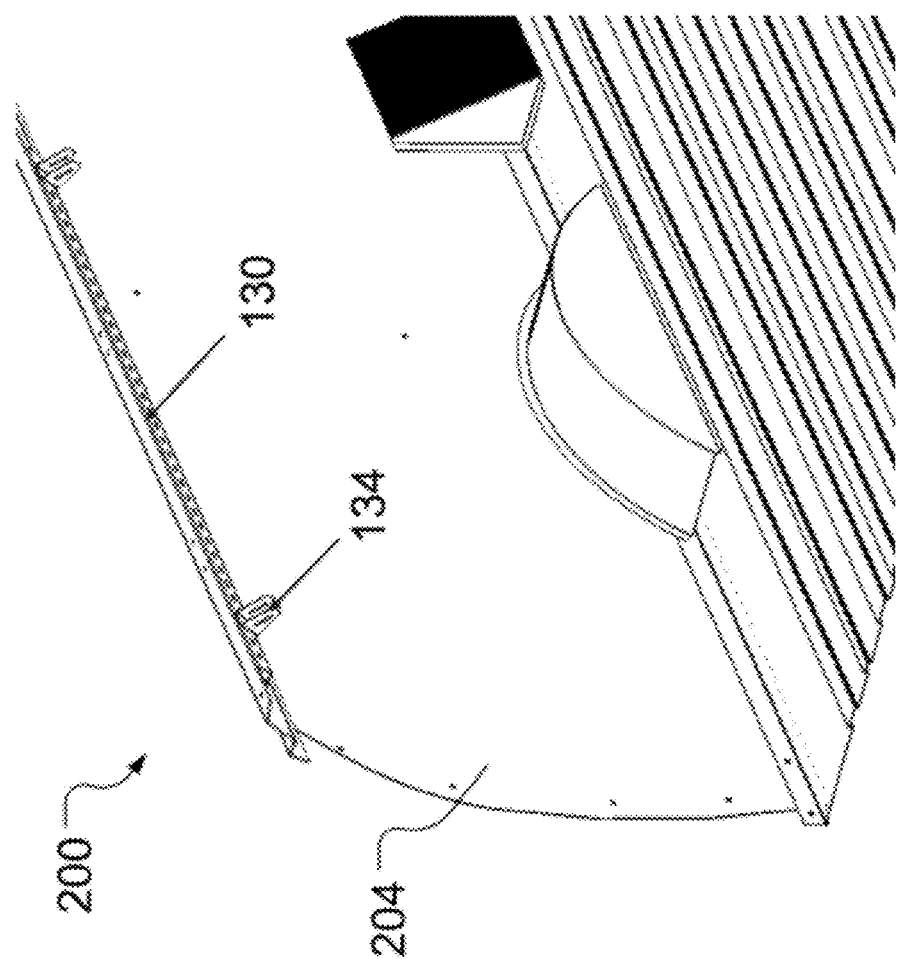
FIG. 6 is a perspective view of a rail attached to the interior of a vehicle for use with the frame shown in FIG. 1.

Referring now to FIGS. 6 and 7, a rail 130 may be fixed to the interior or cargo space of a vehicle 200, such as a cargo van. The vehicle 200 may include a roof 202 (shown in FIG. 9,) at least two sides 204, and a floor 206 (not shown in FIGS. 6 and 7). The cargo space may have a number of different shapes and sizes. For example, the cargo space may include curved or straight walls, and may include a number of other items, such as wheel wells, fuel inlets, door openings, spare tires, access points, electrical access, batteries, bulkhead space, etc. The frame 100 of the present invention is universal so that it can be adjusted to fit in any size or shape cargo space in a plurality of different vehicles.

The rail 130 may be secured to the vehicle 200 at the roof 202, as shown in FIG. 6. Alternatively, the rail 130 may be secured to one of the sides 204 of the vehicle 200. The rail 130 may be secured to the vehicle 200 by a plurality of fasteners, such as screws, for example. The rail 130 may further include a plurality of slots 132. One or more brackets 134 may be used to attach the frame 100 to the rail 130. The brackets 134 may attach to any of the slots 132 by a fastener 136. These brackets 134 may also attach to one of the plurality of holes 109 in the curved member 108, as shown in FIGS. 8 and 9, which allows the width of the frame to be adjusted. Thus, the frame 100 is easily adjustable to fit into any size vehicle. A number of brackets 134 may be spaced apart to accommodate the plurality of curved members 108 on the frame 100. Alternatively, the curved members 108 may be directly secured to the rail 130 without the use of brackets.

Figure 10:
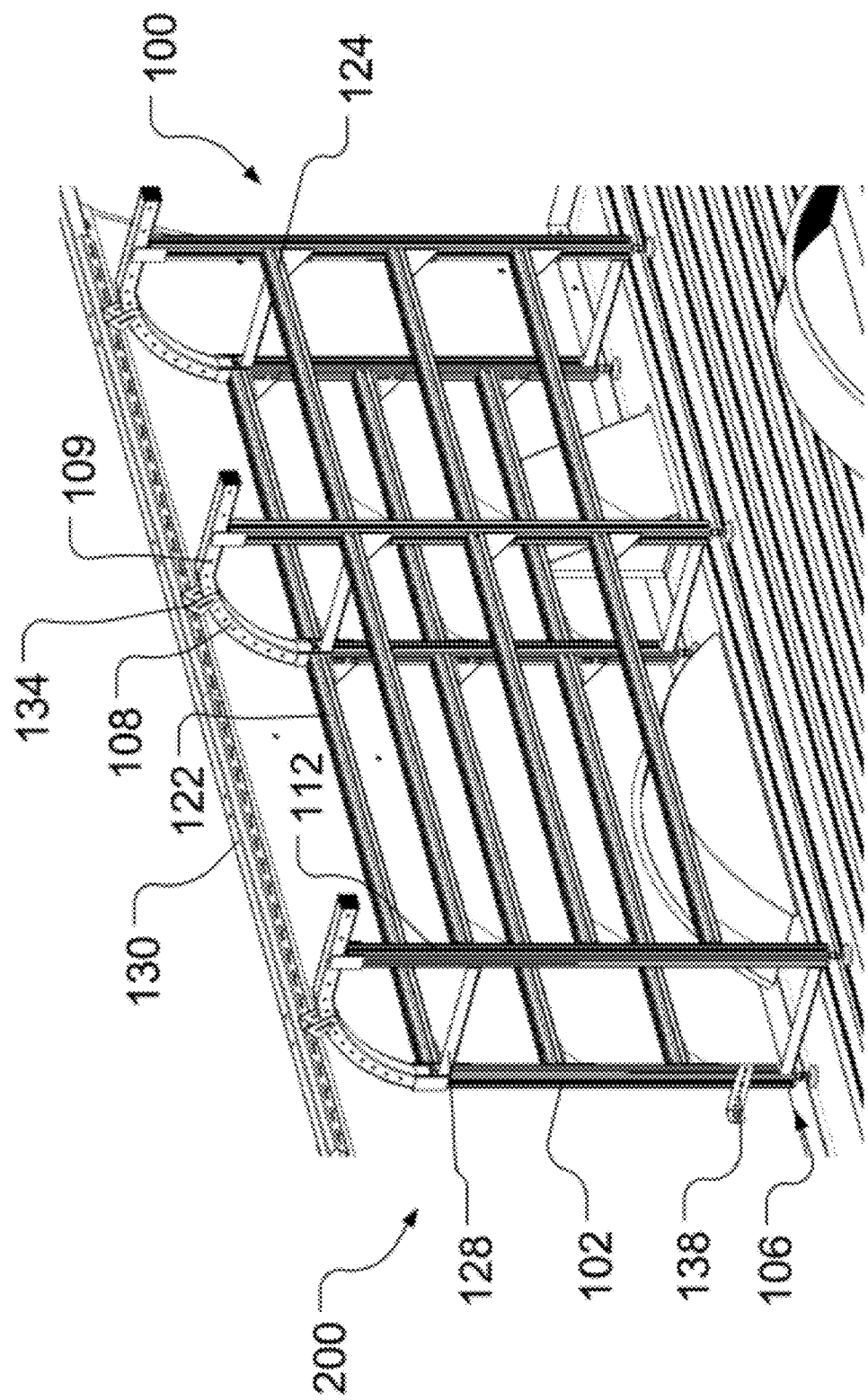
FIG. 10 is a perspective view of the frame installed into a vehicle.

FIG. 10 shows an exemplary embodiment of the frame 100 installed in a vehicle 200. The curved members 108 of the frame 100 may be connected to the rail 130 by brackets 134. The first posts 102 may also be connected to the vehicle 200 by at least one support 138. The support 138 may be drilled into the side 204 of the vehicle 200, for example.

In use, the frame 100 may be installed into the vehicle 200 by securing the rail 130 to the interior of the vehicle 200. The rail 130 may be secured to the roof 202 of the vehicle or alternatively to one of the sides 204 of the vehicle. Brackets 134 may then be attached to the rail 130 at the desired locations and spaced apart from each other. The brackets 134 are then attached to each of the curved members 108. Depending upon the size and shape of the vehicle, the brackets 134 may attach to any of the holes 109 in the curved members 108. In an alternative embodiment, where the rail 130 is secured to a side 204 of the vehicle 200, the first posts 102 may be attached directly to the rail 130.

The second ends 106 of the first posts 102 may then be secured to the side wall 204 of the vehicle 200 by the supports 138. The feet 120 located at the second ends 106 of the first posts 102 are then adjusted to fit snugly against the floor 206 of the vehicle 200. The feet 120 are not drilled or screwed into the floor 206 of the vehicle 200. Thus, the frame 100 may be portable and adjustable.

Next, the second posts 112, the first and second beams 122, 124, and the cross beams 128 may be attached to the frame 100. Alternatively, the first and second beams 122, 124, and the cross beams 128 may be attached to the frame 100 before the frame 100 is installed into the vehicle 200. The first and second posts 102, 112, the first and second beams 122, 124, and the cross beams 128 of the frame 100 may also be adjusted to different positions either before, during, or after installation of the frame 100 into the vehicle 200.

When not in use, the frame 100 may be adjusted or modified to provide more space in the vehicle 200. For example, as shown in FIG. 11, the second posts 112 and second beams 124, and cross beams 128 may be removed, thereby maximizing the storage space of the vehicle. As another example, shown in FIG. 12, the first and second beams 122, 124 may be removed.

In another embodiment, shown in FIGS. 13 and 14, the frame 100 may include a plurality of shelves 300 to provide compartmentalized storage space. The shelves 300 may be connected to the first posts 102 by any suitable fastener, such as by screws or bolts, for example. The shelves 300 may be foldable, as shown in FIG. 14, to provide additional space in the vehicle 200 when the shelves 300 are not in use.

Figure 17:
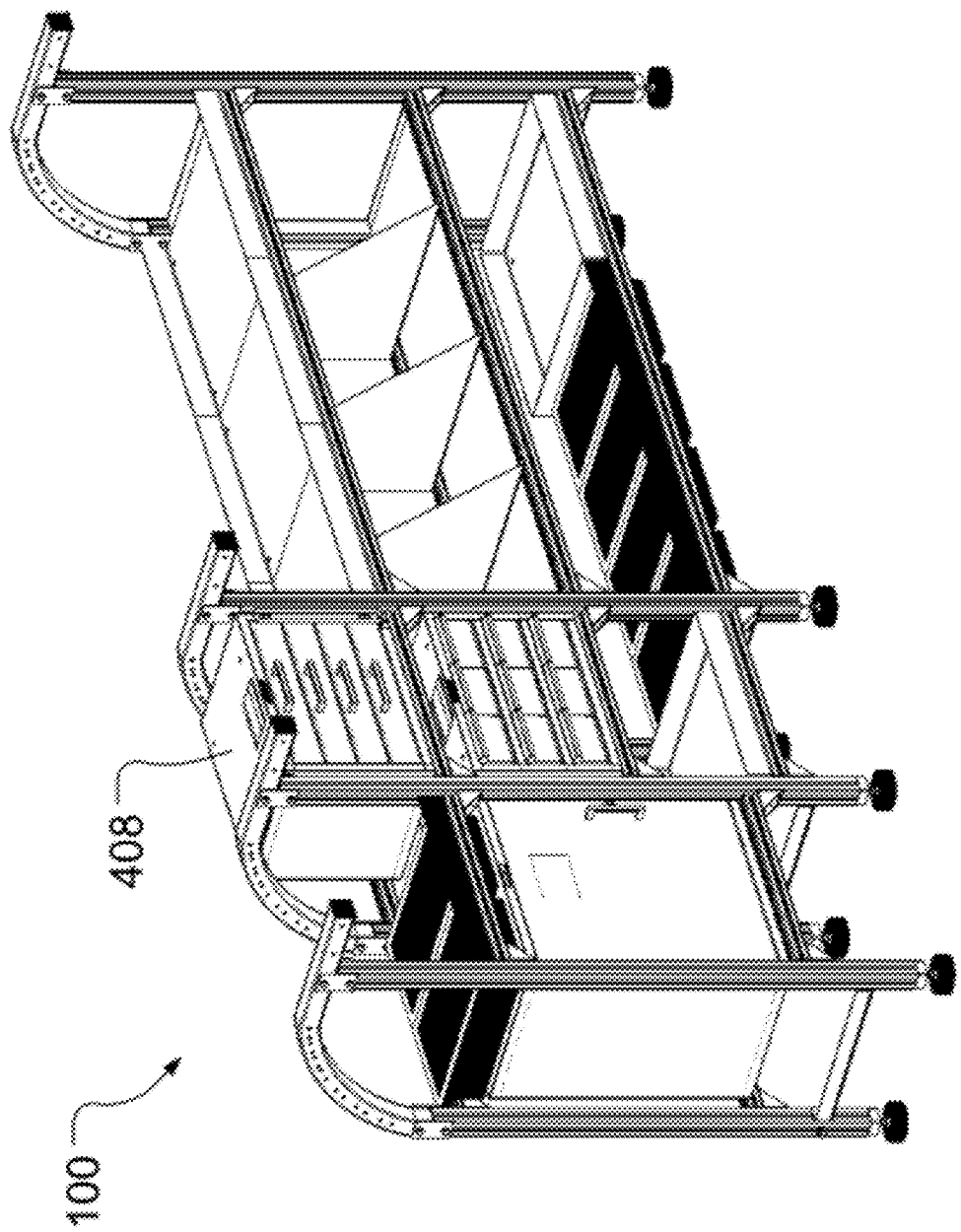
FIG. 17 is a perspective view of the frame shown in FIG. 1 having additional storage features.

Referring now to FIG. 15, the frame 100 may be provided with one or more off-the-shelf storage containers or modules, such as bins 400, and wooden or plastic shelving 402, 404 to provide additional storage space for tools or equipment. These containers may be easily rearranged or replaced to accommodate the needs of the user. As another example, hooks 406 may be provided on the frame 100 to accommodate additional tools or equipment, such as a ladder, as shown in FIG. 16. The frame 100 may further include a plurality of drawers 408, as shown in FIG. 17, to securely stow smaller tools. Other storage components may include racks, sliding dividers, plastic bins, locking cabinets, drawer units, etc. The storage components used with the frame 100 may have a standard length of 18 inches, for example, so that the components are interchangeable to suit the needs of a user. The storage components may be secured to the posts 102, 112 and beams 122, 124 by any suitable fastener, such as by bolts, screws, hinges, rollers, hooks, etc. Alternatively, the storage components may be placed within the posts 102, 112 and beams 122, 124 without being fastened.

Depending upon the number of storage components included, the frame 100 may include additional first posts 102, second posts 112, or curved members 108 to support the storage components. The number of storage components that can be used are only limited by the length of the vehicle. These additional first posts, second posts, or curved members may be attached to the frame 100 either before or after the installation of the frame 100 into the vehicle 200.

Figure 18:
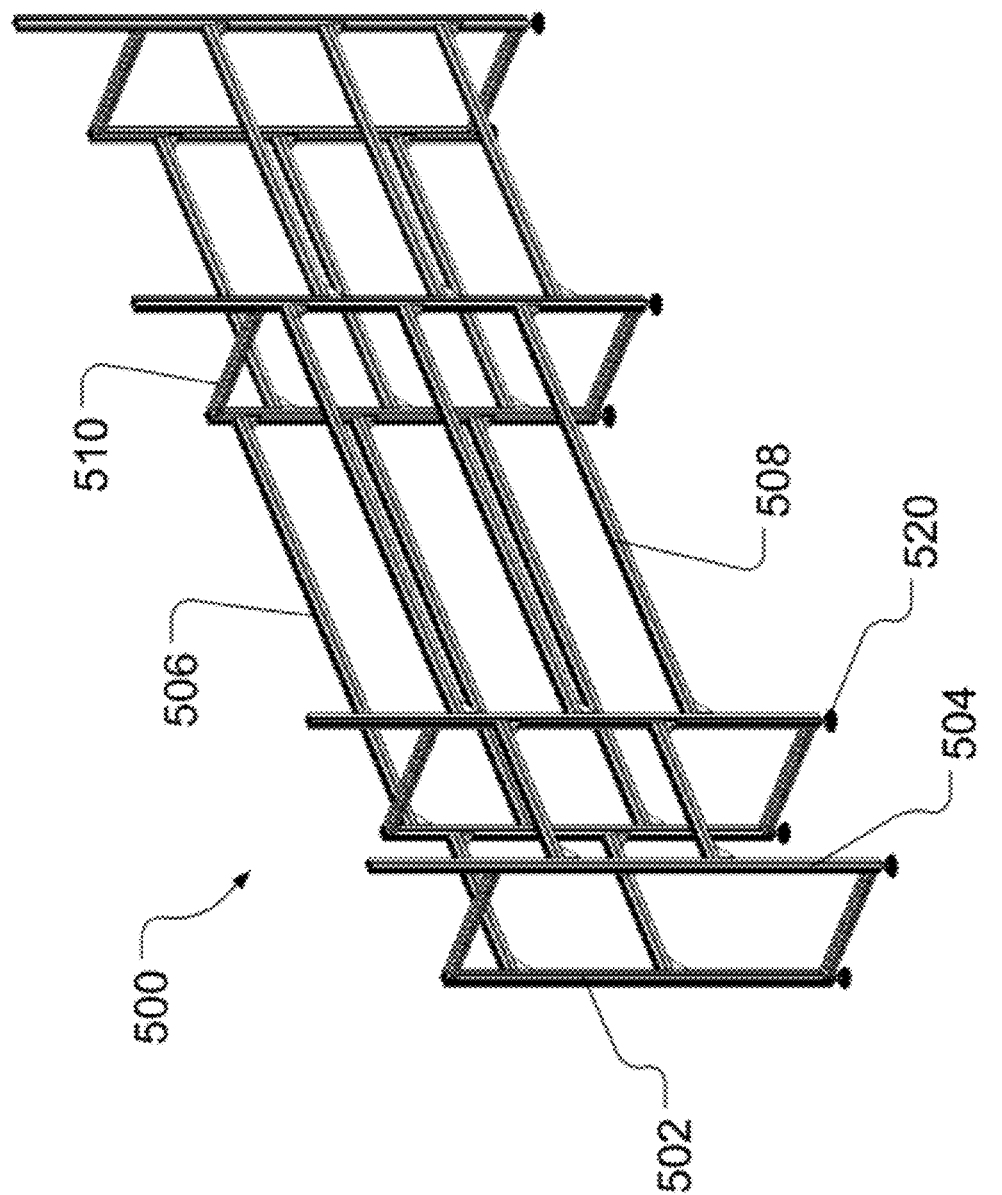
FIG. 18 is perspective view of an alternate frame.

In an alternative embodiment, shown in FIGS. 18-20, a frame 500 is shown which does not include curved members. Frame 500 includes a plurality of first posts 502 and a plurality of second posts 504 spaced apart from the first posts 502. The plurality of second posts 504 may be sized to extend to the roof 202 of a vehicle 200.

The first and second posts 502, 504 may also each include a foot 520 located at one end of the first post 502 and second post 504. The feet 520 may be similar to the feet 120 shown in FIG. 4.

The frame 500 may further comprise at least one first beam 506 for connecting the plurality of first posts 502 to one another. Alternatively, the frame 500 may include a plurality of first beams 506. The frame 500 may further include at least one second beam 508 for connecting a plurality of the second posts 504 to one another. Alternatively, the frame 500 may include a plurality of second beams 508. The first and second beams 506, 508 may be secured to the first and second posts 502, 504 by any suitable adjustable fastening mechanism.

The first posts 502, second posts 504, first beams 506, and second beams 508 may be provided in different lengths and may be made of a lightweight but sturdy material, such as aluminum, for example. The posts 502, 504 and beams 506, 508 may have a load capacity of 300 lbs. or 500 lbs., for example. Further, the first posts 502, second posts 504, first beams 506, and second beams 508 may each have a profile such as the profile shown in FIG. 3A or 3B to facilitate assembly and rearrangement of the frame 500 and storage components.

The frame 500 may further include one or more cross beams 510, as shown in FIG. 18, to connect one of the plurality of first posts 502 to one of the plurality of second posts 504. The cross beams 510 provide additional stability to the frame 500. The cross beams 510 may be made of aluminum, for example, and may have a load capacity and profile similar to those described above with respect to the posts 502, 504 and beams 506, 508. The cross beams 510 may be secured to the first and second posts 502, 504 by bolts, screws, or any other suitable fastener.

The frame 500 may be secured to the interior of a vehicle 200, such as a cargo van, for example, by rail 130. The rail 130 may be secured to the vehicle 200 at the roof 202, as shown in FIG. 19. The rail 130 may be secured to the vehicle 200 in same manner as discussed above with respect to FIG. 6. The frame 500 may be attached to the rail 130 by securing the plurality of second posts 504 to the rail 130. The plurality of second posts 504 are secured to the rail 130 by a bracket, such as a bracket similar to bracket 134. Alternatively, the second posts 504 may be directly secured to the rail 130 by bolts, screws, or any other suitable fastener. The first posts 502 may be secured to the side 204 of the vehicle 200 by at least one support 522. The frame 500 is easily adjustable to fit in any size vehicle.

Alternatively, as shown in FIG. 20, the rail 130 may be secured to one of the sides 204 of the vehicle 200. In this embodiment, the plurality of first posts 502 may be secured to the rail 130 by bolts, screws, or any other suitable fastener, or by a bracket such as bracket 134. The second posts 504 may or may not be secured to the roof 202 of the vehicle 200.

The modular storage system of the present application has a number of advantages, such as it is adjustable in various dimensions, which allows a single system with the same parts or many of the same parts to be used for various model vehicles. Further, numerous off-the shelf storage components can be used with the system and changed out if desired to accommodate the needs of the user. Additionally, the system is portable so it can easily be installed and stowed away.

It will be appreciated now that what has been provided is a significantly improved modular storage system for a vehicle which is simple, robust, and adjustable. While the invention has been described in connection with certain embodiments, it will be understood that it is not intended to limit the invention to those particular embodiments. On the contrary, it is intended to cover all alternatives modifications, and equivalents included within the spirit and scope of the invention as defined by the appended claims.

We claim:

1. A modular storage system for the cargo space of a vehicle comprising:
    a frame having:
        a plurality of first posts, the first posts each being secured to a curved member,
        each curved member having such a shape so as to enable the modular storage system to be useable with cargo spaces of different shapes and sizes in a plurality of different vehicles;
        a plurality of second posts, the second posts each being secured to the curved members and spaced a distance away from each of the plurality of first posts;
        a first beam connecting one of the plurality of first posts to another of the plurality of first posts; and
        a second beam connecting one of the plurality of second posts to another of the plurality of second posts; and
    a rail secured to an interior of the vehicle for securing the system to the vehicle;
    wherein each curved member includes a plurality of holes for attaching to the first posts, the second posts, and the rail, the holes enabling the frame to be adjustable.

2. The modular storage system of claim 1 further comprising a bracket securing at least one of the curved members to the rail.

3. The modular storage system of claim 1 further comprising at least one cross beam connecting one of the plurality of first posts to one of the plurality of second posts.

4. The modular storage system of claim 1 further comprising a plurality of feet attached to the plurality of first and second posts, the plurality of feet comprising compressible mounting feet.

5. The modular storage system of claim 1 wherein the first and second posts include telescoping members to allow the system to be adjustable in height.

6. The modular storage system of claim 1 wherein the vehicle has a roof and at least two sides, and wherein the rail is secured to the roof of the vehicle.

7. The modular storage system of claim 1 wherein the vehicle has a roof and at least two sides, and wherein the rail is secured to one of the sides of the vehicle.

8. The modular storage system of claim 1 further comprising at least one of a storage bin, a drawer, or a shelf located between the first beam and the second beam.

9. The modular storage system of claim 1 wherein the first posts, second posts, first beam, and second beam are made of aluminum.

10. The modular storage system of claim 1 wherein the vehicle is a cargo van.

11. The modular storage system of claim 1 wherein a portion of the system is removable in order to increase the storage capacity of the vehicle.

12. The modular storage system of claim 1 wherein the frame is adjustable in the dimensions of height and width.

13. The modular storage system of claim 1 wherein the first post is secured to a vertical portion of the curved member.

14. The modular storage system of claim 1 wherein the second post is secured to a horizontal portion of the curved member.

15. A method of installing a modular storage system in the cargo space of a vehicle comprising:

providing a frame including a plurality of first posts each having a first end and a second end, the first posts each being secured to a curved member at the first end, a plurality of second posts each having a first end and a second end, the second posts each being secured to the curved members at the first end and spaced a distance away from each of the plurality of first posts, a first beam connecting one of the plurality of first posts to another of the plurality of first posts, and a second beam connecting one of the plurality of second posts to another of the plurality of second posts;

securing the curved members to a rail attached to an interior of the vehicle;

securing the first posts to the interior of the vehicle;

securing the second end of the first and second posts to a floor of the vehicle without drilling into the floor of the vehicle; and adjusting a width of the frame by moving the second posts along holes located in the curved members.

16. The method of claim 15 further comprising a plurality of brackets for securing the curved member to the rail.

17. The method of claim 15 further comprising securing the second end of the first and second posts to the floor of the vehicle using compressible feet.

18. The method of claim 15 wherein the curved members have a shape such that the modular storage system may be useable with cargo spaces of different shapes and sizes in a plurality of different vehicles.

19. The method of claim 15 further comprising installing at least one of a storage bin, a drawer, or a shelf between the first beam and the second beam.

20. The method of claim 15 further comprising securing the rail to a roof of the vehicle.

21. The method of claim 15 further comprising securing the rail to a side of the vehicle.

22. The method of claim 15 wherein the position of the curved member along the rail can be adjusted.

23. A vehicle cargo space comprising:
a modular storage system including:
a frame having:
a plurality of first posts, the first posts each being secured to a curved member,
the curved member having such a shape so as to enable the modular storage system to be useable with cargo spaces of different shapes and sizes in a plurality of different vehicles;
a plurality of second posts, the second posts each being secured to the curved members and spaced a distance away from each of the plurality of first posts;
a first beam connecting one of the plurality of first posts to another of the plurality of first posts; and
a second beam connecting one of the plurality of second posts to another of the plurality of second posts;
a rail secured to an interior of the vehicle; and
a bracket securing at least one of the curved members to the rail;
wherein each curved member includes a plurality of holes for attaching to the first posts, the second posts, and the rail, the holes enabling the frame to be adjustable.

24. A modular storage system for the cargo space of a vehicle comprising:
a frame having:
a plurality of first posts, the first posts each being secured to a curved member,
each curved member having such a shape so as to enable the modular storage system to be useable with cargo spaces of different shapes and sizes in a plurality of different vehicles;
a plurality of second posts, the second posts each being secured to the curved members and spaced a distance away from each of the plurality of first posts;
a first beam connecting one of the plurality of first posts to another of the plurality of first posts; and
a second beam connecting one of the plurality of second posts to another of the plurality of second posts; and
a rail secured to an interior of the vehicle for securing the system to the vehicle;
wherein the vehicle has a roof and at least two sides, and wherein the rail is secured to the roof of the vehicle.

* * * * *